United States Patent

Nass

[15] 3,675,756
[45] July 11, 1972

[54] GANTRY SCRAPER CONVEYOR

[72] Inventor: Louis Nass, Kingersheim, France
[73] Assignee: Societe Anonyme dite AMECO S.A., Kingersheim, France
[22] Filed: Jan. 6, 1971
[21] Appl. No.: 104,396

[52] U.S. Cl..............................198/36, 198/109, 198/208
[51] Int. Cl......................................B65g 15/30, B65g 65/28
[58] Field of Search............................198/36, 109, 174, 208

[56] References Cited

UNITED STATES PATENTS 296,509  4/1884  Bartholomew.....................198/208 X Primary Examiner—Edward A. Sroka
Attorney—Robert E. Burns and Emmanuel J. Lobato

[57] ABSTRACT

A gantry scraper conveyor for storing or picking up material in a heap comprising in a substantially inverted V-shaped frame structure a primary arm and a secondary arm supporting a driven double endless chain resting on two opposite slopes of the heap of the material to be handled with a continuous scraper chain running firstly upwards along the primary arm and then downwardly along the secondary arm. The primary arm has a driving drum with sprockets at the lower end and a guide pulley at the top. Another guide pulley at the adjacent upper end of the secondary arm, so as to provide a short horizontal section therebetween, and a return drum with sprockets at the lower end of the secondary arm, and tractive effort compensating means incorporated in said secondary arm for cancelling the effort due to the upward movement of the chain along the secondary arm while maintaining a proper chain tension.

9 Claims, 9 Drawing Figures

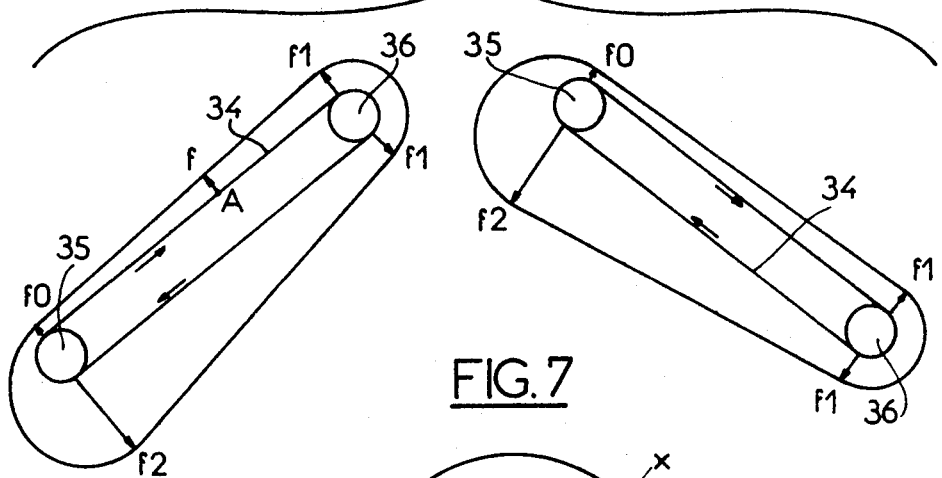
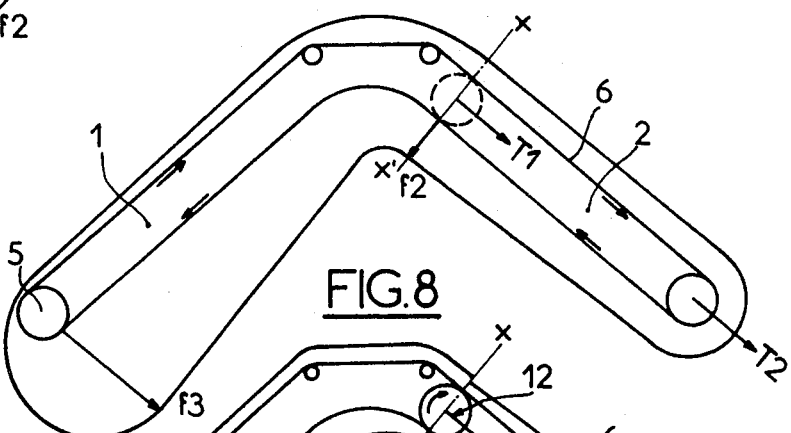
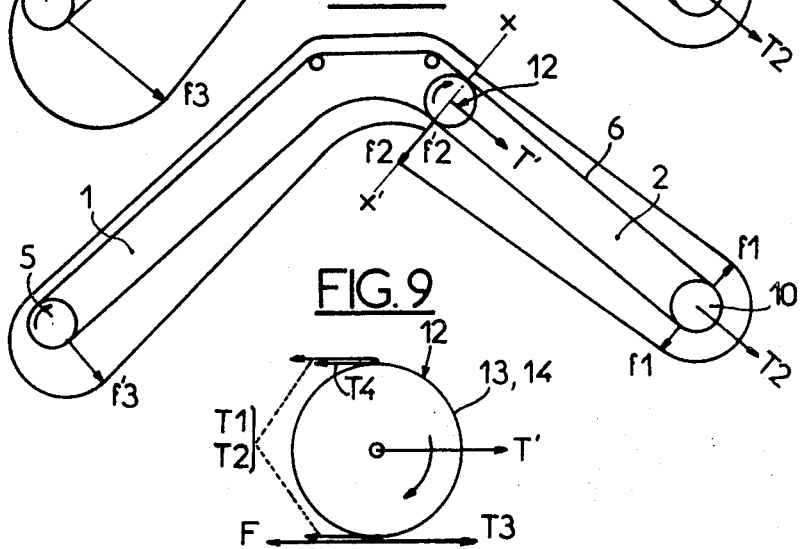

GANTRY SCRAPER CONVEYOR

BACKGROUND OF THE INVENTION

The present invention relates in general to scraper conveyors of the gantry type, and has specific reference to gantry scraper conveyors designed for picking up loosely stored materials.

DESCRIPTION OF THE PRIOR ART

These scraper conveyors, especially those of the gantry type for conveying materials on inclines, have roughly the shape of an inverted V and are becoming increasingly popular for these applications; however, they must have a number of properties. Thus, they must be extremely reliable, afford relatively high outputs, have relatively reduced over-all dimensions yet an appreciable sturdiness, while permitting their manufacture under mass production conditions at a competitive cost.

These well-known scraper conveyors are currently used in many handling installations for the storage or picking up of pulverulent or granular materials. These materials constitute the raw materials in many industrials fields such as ironworks, chemical industries, manufacturing plants, etc.

These scraper conveyors comprise as a rule a gantry supporting a main arm and a secondary arm forming a certain angle with each other. Each arm supports a scraper chain to which a plurality of flights are attached. One chain is driven to operate its working run upwards and the other to operate its working run downwards. Thus, the various driving members are doubled, and the cost is increased accordingly. Moreover, known scraper conveyors are objectionable on account of the difficult problem of transferring the material from the main arm to the secondary arm. Moreover, the considerable number of parts causes the assembly to be relatively heavy and cumbersome, so that overloads must be contemplated which lead to increased dimensions of the conveyor and a proportional increment in cost.

Moreover, due to its very considerable weight the apparatus require powerful transport means involving not only additional expenses but also a limitation in the transport speed.

SUMMARY OF THE INVENTION

It is the essential object of the present invention to avoid the above-mentioned inconveniences by providing a gantry scraper conveyor of improved design which is capable of operating with a reliability at least as great as that of hitherto known scraper conveyors while permitting a substantial reduction in the number of its component elements so as to reduce its weight and increase the rate of operation. On the other hand, the scraper conveyor according to this invention may be constructed at a lower cost than hitherto known apparatus of this character.

To this end, the present invention provides a gantry scraper conveyor comprising a primary arm and a secondary arm resting upon the two opposite slopes of a heap of materials to be stored or picked up, a single continuous scraper chain running along said primary arm and secondary arm. Traction compensating means act on the upper and lower runs of the scraper chain which are carried by said secondary arm for cancelling the effort due to the upward movement of the chain along said secondary arm while maintaining said chain under a proper tension.

BRIEF DESCRIPTION OF THE DRAWINGS

Various possible forms of embodiment of the present invention will now be described in detail with reference to the accompanying drawings, in which:

FIG. 6 is a diagram illustrating the efforts developed in a known type of scraper comprising two separate sections, i.e. a scraper for raising material on the right-hand side and a scraper for lowering material on the left-hand side;

FIG. 7 is another diagram illustrating the efforts developed in a scraper conveyor comprising a continuous chain, without traction compensating means;

FIG. 8 is another diagram illustrating the efforts developed in a continuous-chain scraper conveyor comprising a traction compensating device according to this invention, and FIG. 9 is a diagram of the forces implemented in a conveyor according to this invention.

DESCRIPTION OF THE PREFERRED EMBODIMENTS

Figure 1:
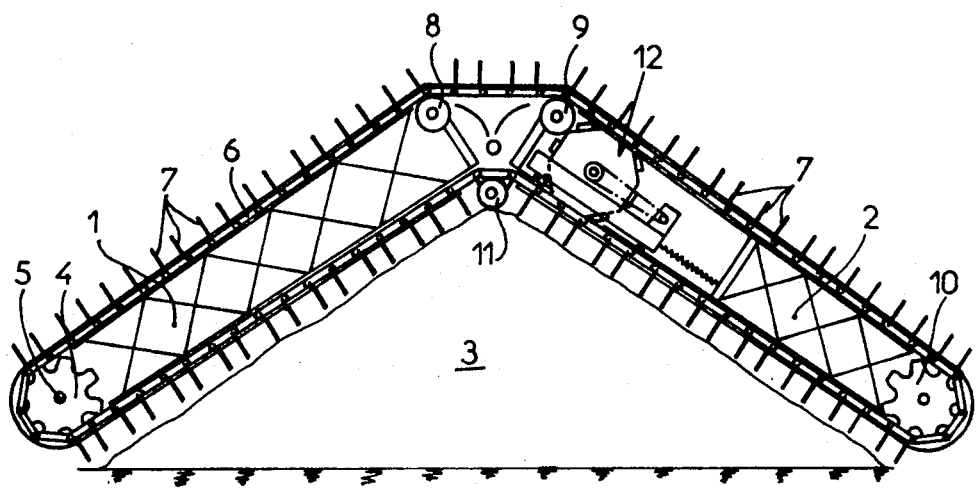
FIG. 1 is a diagrammatic side elevation view of a gantry scraper conveyor according to the invention.

The gantry scraper conveyor according to the present invention as illustrated in FIG. 1, comprises a frame structure substantially of inverted V configuration, i.e. with a primary left-hand arm 1 and a secondary right-hand arm 2 inter-connected at their upper portions and resting in operation on the left-hand and right-hand slopes respectively of a heap 3 of material to be conveyed or picked up. The lower end of the primary left-hand arm 1 has rotatably mounted thereto a driving drum 4 rigid with a power shaft 5. This drum 4 comprises a pair of sprockets also rigid therewith, over which a pair of endless parallel scraper chains 6 are engaged. These chains carry between adjacent pairs of links scrapers or flights 7 adapted to convey material picked up from the heap 3. The drum 4 revolves in the direction shown by the arrow and the upper run of the common chain 6, as it leaves the drum 4, moves upwards to the upper end of the primary arm 1 and then over a pair of parallel guide rollers 8, 9 carried by said arms 1 and 2, respectively, along a substantially horizontal path. Subsequently, the chain 6 follows an inclined path from the top to the lower end of the right-hand or secondary arm 2 where it passes over a free-rotating return drum 10 carried by the lower end of this arm 2 and comprising like driving drum 4 a pair of sprockets corresponding to the two sides of the scraper chain 6. After passing over the return drum 10 the chain 6 engages the right-hand slope of the heap 3 where the flights 7 carry along to the top of the heap 3 the material to be picked up. At the top of the heap 3 the chain 6 passes over a single guide roller 11 and then down to the left and lower end of the primary arm 1, the material thus following the left-hand slope of the pile or heap 3, as shown.

Figure 3:
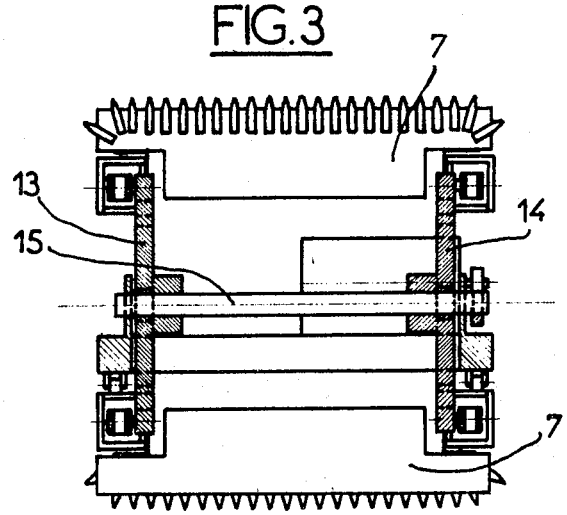
FIG. 3 is a cross-section view taken along the section line III—I of FIG. 2.
Figure 4:
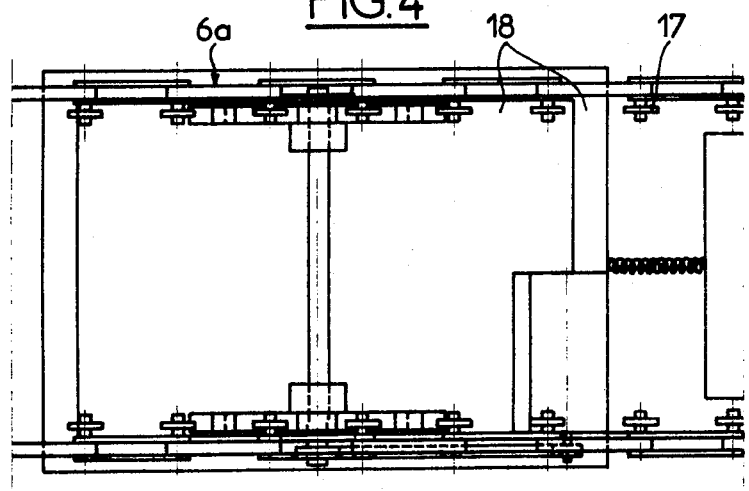
FIG. 4 is a fragmentary plan view of a scraper chain.

According to this invention, the secondary arm 2 comprises at its upper portion a traction compensating device designated generally by the reference numeral 12 in FIG. 1 and described more in detail hereinafter with specific reference to FIGS. 2, 3 and 4 of the drawings.

The traction compensating device 12 comprises essentially a pair of sprockets 13, 14 rigid with a transverse shaft 15 rotatably mounted on a carriage 16. Considering more particularly FIG. 2 it will be seen that the upper run 6a and the lower run 6b of chain 6 engage the visible sprocket 13 (the same applying to the other side with sprocket 14). This sprocket 13 comprises peripheral teeth 13a having a pitch corresponding to that of the pairs of rollers 17 carried by the link pins of chain runs 6a and 6b. The teeth 13a of sprocket 13 are thus caused to engage the gaps 18 left between adjacent rollers 17. Each cavity 13b formed between a pair of successive teeth 13a of sprocket 13 are shaped to conform to the rollers 17 constituting the rolling-contact elements of chain 6. In fact, in FIG. 2 it will be seen that the rollers 17 are guided in upper and lower slideways 19, 20 respectively extending along the path of the two chain runs.

Figure 2:
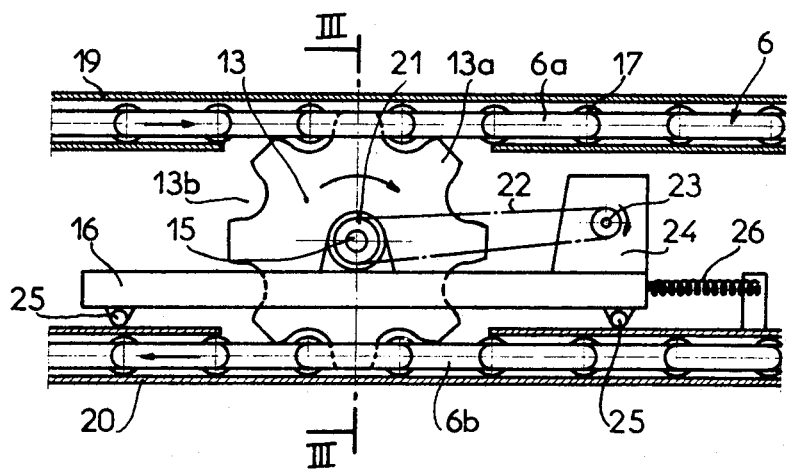
FIG. 2 is a fragmentary longitudinal section view showing on a larger scale a traction compensating device of the conveyor.

In FIG. 2 it is also shown that the shaft 15 to which the sprockets 13, 14 are rigidly connected carry a small chain sprocket 21 drivingly connected through a small chain 22 to another sprocket 23 rigid with the shaft of a driving motor 24 supported by said carriage 16. This carriage 16 is on the other hand adapted to slide longitudinally on the lower slidaway 20 with the interposition of rollers 25. The carriage 16 is urged to the right, as seen in FIG. 2, by a spring 26 anchored to a fixed point of the frame structure. The force of this spring 26 is exerted in a direction opposed to the direction of motion of the lower run 6b of chain 6 for reasons to be explained presently.

Figure 5:
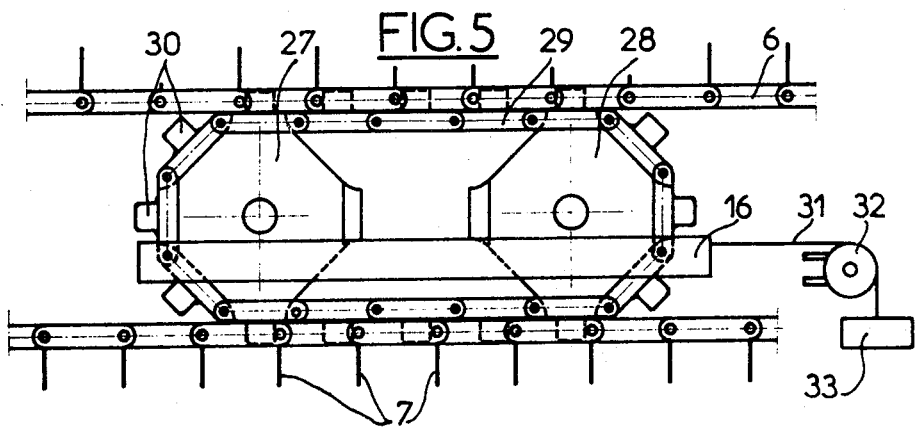
FIG. 5 is a diagrammatic elevation view showing a modified form of embodiment of the traction compensating device.

In the modified form of embodiment illustrated in FIG. 5 the movable carriage 16 carries two pairs of sprockets 27, 28 over which a double auxiliary endless roller chain 29 is passed, the links of this chain 29 comprising integral outwardly-extending teeth or lugs 30 adapted to mesh with the links of the scraper chain 6. At least one pair of toothed wheels 27, 28 is rotatably driven for example in the manner illustrated in FIG. 2. In this specific form of embodiment the movable carriage 16 is constantly urged to the right by a cable 31 passing over a pulley 32 and connected to a counterweight 33.

Now the mode of operation of the single chain scraper conveyor according to this invention will be described by way of example, with specific reference to FIGS. 6 to 9 of the drawings.

The left-hand portion of FIG. 6 illustrates a stress diagram obtained in a conventional, downward-working scraper conveyor. This scraper conveyor comprises an endless scraper chain 34 passing over a lower driving drum 35 and an upper return drum 36. Due to the weight of the scraper chain 34 and of the metal parts carried thereby the effort $f$ exerted on the chain 34 at any point A thereof increases on the upper ascending run of the chain from a minimum value $f_0$ measured at the lower driving drum 35 to a higher value $f_1$ measured at the upper return drum 36. This effort remains constant and equal to the value $f_1$ as the chain passes over the return drum 36, and then increases rapidly along the lower run of chain 34 moving towards the lower driving drum 35. Thus, this effort increases from said higher value $f_1$ to the maximum value $f_2$ measured near the lower driving drum 35, since to the effort necessary for displacing the chain 34 there is added the effort necessary for carrying along the material down the slope of the heap, while subtracting the effort due to the weight of the chain.

In the diagram of FIG. 8 it will be seen that when a compensating device 12 is provided according to this invention the effort exerted on the scraper chain 6 which attains a value $f_2$ in the conventional system is reduced to a substantially lower value $f'_2$ which then increases gradually to another value $f'_3$ across the driving drum 5 but is nevertheless definitely lower than the value of the effort which would be required at the same location if the compensating device 12 had not been provided (as clearly shown by the explanatory diagram of FIG. 7).

Of course, various details may be modified in the practical embodiment of the present invention without inasmuch departing from the basic principles thereof, as set forth in the attached claims.

What I claim and desire to secure by Letters Patent is:

1. Gantry scraper conveyor comprising, a primary arm and a secondary arm operable to a position resting upon the two opposite slopes of a heap of material to be stored or picked up, a single continuous scraper chain travelling along said primary arm and secondary arm, traction compensating means acting on the upper and lower runs of said scraper chain which are carried by said secondary arm, said compensating means comprising a carriage mounted for longitudinal movement on said secondary arm, secondary driving means carried by said movable carriage and in meshing engagement with the upper and lower runs of said scraper chain, and means for exerting on said movable carriage a tractive effort in a direction opposed to the direction of movement of the lower, upwardly moving run of the scraper chain in said secondary arm, said traction compensating means cancelling the effort due to the upward movement of the chain along said secondary arm, while maintaining said chain properly tensioned.

2. Gantry scraper conveyor as set forth in claim 1, wherein said traction means comprises a spring anchored at one end to said movable carrraige and at the opposite end to said secondary arm.

3. Gantry scraper conveyor as set forth in claim 1, wherein said traction means comprise a cable anchored to said carriage, a return pulley over which said cable is caused to pass, and a counterweight attached to said cable.

4. Gantry scraper conveyor as set forth in claim 1, wherein said secondary driving means comprise first and second pairs of toothed wheels, means for rotatably driving at least one of said pairs of toothed wheels, an endless secondary chain passing over said two pairs of toothed wheels, and teeth carried by said secondary chain and meshing with the links of said scraper chain.

5. Gantry scraper conveyor as set forth in claim 1, wherein said secondary driving means meshing with said scraper chain comprise a pair of driving sprockets rotatably mounted on said movable carriage and meshing with the two runs of the scraper chain of the secondary arm.

6. Gantry scraper conveyor as set forth in claim 5, comprising rollers rotatably mounted at spaced intervals on the pins of the scraper chain links, and teeth disposed likewise at spaced intervals on the outer periphery of each sprocket with a pitch corresponding to the pitch of said rollers, so that said rollers mesh with said teeth for regularly and constantly driving said scraper chain.

7. Gantry scraper conveyor as set forth in claim 6, comprising notches or cavities formed between said sprocket teeth and having a radius of curvature corresponding to that of the rollers carried by the scraper chain.

8. A gantry scraper comprising two different operating arms consisting of a primary arm and a secondary arm operable to a position resting upon the two opposite slopes of a heap of material to be stored or picked up, a single continuous scraper chain provided with scraper tongue elements travelling along said primary and secondary arms, and traction compensating means carried by said secondary arm and acting on the upper and lower runs of said scraper chain.

9. A gantry scraper according to claim 8, wherein said traction compensating means comprises a carriage means mounted for longitudinal movement on said secondary arm, said carriage means being operable to cancel the effort due to the upward movement of the chain along said secondary arm while maintaining said chain properly tensioned.

* * * * *